United States Patent
Kimura

(10) Patent No.: US 11,580,662 B2
(45) Date of Patent: Feb. 14, 2023

(54) ASSOCIATING THREE-DIMENSIONAL COORDINATES WITH TWO-DIMENSIONAL FEATURE POINTS

(71) Applicant: Magik Eye Inc., New York, NY (US)

(72) Inventor: Akiteru Kimura, Hachioji (JP)

(73) Assignee: Magik Eye Inc., New York, NY (US)

(*) Notice: Subject to any disclaimer, the term of this patent is extended or adjusted under 35 U.S.C. 154(b) by 233 days.

(21) Appl. No.: 17/130,378

(22) Filed: Dec. 22, 2020

(65) Prior Publication Data

US 2021/0201529 A1 Jul. 1, 2021

Related U.S. Application Data

(60) Provisional application No. 62/954,533, filed on Dec. 29, 2019.

(51) Int. Cl.
*G06T 7/73* (2017.01)
*G01C 3/08* (2006.01)
(Continued)

(52) U.S. Cl.
CPC .................. *G06T 7/73* (2017.01); *G01C 3/08* (2013.01); *G06V 20/58* (2022.01); *G06V 40/161* (2022.01);
(Continued)

(58) Field of Classification Search
CPC ... G06T 7/73; G06T 2207/30201; G01C 3/08; G06V 20/58; G06V 40/161; G06V 40/28;
(Continued)

(56) References Cited

U.S. PATENT DOCUMENTS

| 4,914,460 A | 4/1990 | Caimi et al. |
| 5,699,444 A | 12/1997 | Palm |

(Continued)

FOREIGN PATENT DOCUMENTS

| CN | 101794065 A | 8/2010 |
| CN | 103196385 A | 7/2013 |

(Continued)

OTHER PUBLICATIONS

International Search Report and Written Opinion dated in corresponding PCT/US2020/066554 dated Dec. 22, 2020, 9 pages.

*Primary Examiner* — Jerome Grant, II
(74) *Attorney, Agent, or Firm* — Tong, Rea, Bentley & Kim, LLC

(57) ABSTRACT

An example method includes causing a light projecting system of a distance sensor to project a three-dimensional pattern of light onto an object, wherein the three-dimensional pattern of light comprises a plurality of points of light that collectively forms the pattern, causing a light receiving system of the distance sensor to acquire an image of the three-dimensional pattern of light projected onto the object, causing the light receiving system to acquire a two-dimensional image of the object, detecting a feature point in the two-dimensional image of the object, identifying an interpolation area for the feature point, and computing three-dimensional coordinates for the feature point by interpolating using three-dimensional coordinates of two points of the plurality of points that are within the interpolation area.

20 Claims, 12 Drawing Sheets

(51) Int. Cl.
  *G06V 20/58* (2022.01)
  *G06V 40/20* (2022.01)
  *G06V 40/16* (2022.01)
(52) U.S. Cl.
  CPC .... *G06V 40/28* (2022.01); *G06T 2207/30201* (2013.01)
(58) Field of Classification Search
  CPC ............. G06V 2201/121; G06V 10/46; G06V 10/471; G06V 10/145; G06V 20/653; G06V 40/107; G06V 40/166
  USPC ........................................................ 382/103
  See application file for complete search history.

(56) References Cited

U.S. PATENT DOCUMENTS

| | | | |
|---|---|---|---|
| 5,730,702 | A | 3/1998 | Tanaka et al. |
| 5,870,136 | A | 2/1999 | Fuchs et al. |
| 5,980,454 | A | 11/1999 | Broome |
| 6,038,415 | A | 3/2000 | Nishi et al. |
| 6,442,476 | B1 | 8/2002 | Poropat |
| 6,668,082 | B1 | 12/2003 | Davison et al. |
| 6,937,350 | B2 | 8/2005 | Shirley |
| 7,191,056 | B2 | 3/2007 | Costello et al. |
| 7,193,645 | B1 | 3/2007 | Aagaard et al. |
| 7,375,803 | B1 | 5/2008 | Bamji |
| 7,589,825 | B2 | 9/2009 | Orchard et al. |
| 9,098,909 | B2 | 8/2015 | Nomura |
| 9,488,757 | B2 | 11/2016 | Mukawa |
| 9,536,339 | B1 | 1/2017 | Worley et al. |
| 9,686,539 | B1 | 6/2017 | Zuliani et al. |
| 9,888,225 | B2 | 2/2018 | Znamensky et al. |
| 9,986,208 | B2 | 5/2018 | Chao et al. |
| 2002/0005856 | A1 | 1/2002 | Sasaki |
| 2003/0071891 | A1 | 4/2003 | Geng |
| 2004/0167744 | A1 | 8/2004 | Lin et al. |
| 2006/0044546 | A1 | 3/2006 | Lewin et al. |
| 2006/0055942 | A1 | 3/2006 | Krattiger |
| 2006/0210148 | A1 | 9/2006 | Nakashima |
| 2006/0290781 | A1 | 12/2006 | Hama |
| 2007/0091174 | A1 | 4/2007 | Kochi et al. |
| 2007/0165243 | A1 | 7/2007 | Kang et al. |
| 2007/0206099 | A1 | 9/2007 | Matsuo |
| 2010/0007719 | A1 | 1/2010 | Frey et al. |
| 2010/0149315 | A1 | 6/2010 | Qu et al. |
| 2010/0223706 | A1 | 9/2010 | Becker et al. |
| 2010/0238416 | A1 | 9/2010 | Kuwata |
| 2011/0002532 | A1 | 1/2011 | Frakes et al. |
| 2011/0037849 | A1 | 2/2011 | Niclass et al. |
| 2011/0188054 | A1 | 8/2011 | Petronius et al. |
| 2012/0051588 | A1 | 3/2012 | Mceldowney |
| 2012/0056982 | A1 | 3/2012 | Katz et al. |
| 2012/0062758 | A1 | 3/2012 | Devine et al. |
| 2012/0113252 | A1 | 5/2012 | Yang et al. |
| 2012/0219699 | A1 | 8/2012 | Pettersson |
| 2012/0225718 | A1 | 9/2012 | Zhang |
| 2012/0236288 | A1 | 9/2012 | Stanley |
| 2012/0236317 | A1 | 9/2012 | Nomura |
| 2013/0076865 | A1 | 3/2013 | Tateno et al. |
| 2013/0088575 | A1 | 4/2013 | Park et al. |
| 2013/0155417 | A1 | 6/2013 | Ohsawa |
| 2013/0242090 | A1 | 9/2013 | Yoshikawa |
| 2013/0307933 | A1 | 11/2013 | Znamensky et al. |
| 2013/0314688 | A1 | 11/2013 | Likholyot |
| 2014/0000520 | A1 | 1/2014 | Bareket |
| 2014/0009571 | A1 | 1/2014 | Geng |
| 2014/0016113 | A1 | 1/2014 | Holt et al. |
| 2014/0036096 | A1 | 2/2014 | Sterngren |
| 2014/0071239 | A1 | 3/2014 | Yokota |
| 2014/0085429 | A1 | 3/2014 | Hérbert |
| 2014/0125813 | A1 | 5/2014 | Holz |
| 2014/0207326 | A1 | 7/2014 | Murphy |
| 2014/0241614 | A1 | 8/2014 | Lee |
| 2014/0275986 | A1 | 9/2014 | Vertikov |
| 2014/0320605 | A1 | 10/2014 | Johnson |
| 2015/0009301 | A1 | 1/2015 | Ribnick et al. |
| 2015/0012244 | A1 | 1/2015 | Oki |
| 2015/0062558 | A1 | 3/2015 | Koppal et al. |
| 2015/0077764 | A1 | 3/2015 | Braker et al. |
| 2015/0131054 | A1 | 5/2015 | Wuellner et al. |
| 2015/0016003 | A1 | 6/2015 | Terry et al. |
| 2015/0171236 | A1 | 6/2015 | Murray |
| 2015/0248796 | A1 | 9/2015 | Iyer et al. |
| 2015/0268399 | A1 | 9/2015 | Futterer |
| 2015/0288956 | A1 | 10/2015 | Mallet et al. |
| 2015/0323321 | A1 | 11/2015 | Oumi |
| 2015/0336013 | A1 | 11/2015 | Stenzier et al. |
| 2015/0381907 | A1 | 12/2015 | Boetliger et al. |
| 2016/0022374 | A1 | 1/2016 | Haider |
| 2016/0041266 | A1 | 2/2016 | Smits |
| 2016/0117561 | A1 | 4/2016 | Miyazawa et al. |
| 2016/0128553 | A1 | 5/2016 | Geng |
| 2016/0157725 | A1 | 6/2016 | Munoz |
| 2016/0178915 | A1 | 6/2016 | Mor et al. |
| 2016/0249810 | A1 | 9/2016 | Darty et al. |
| 2016/0261854 | A1 | 9/2016 | Ryu et al. |
| 2016/0267682 | A1 | 9/2016 | Yamashita |
| 2016/0288330 | A1 | 10/2016 | Konolige |
| 2016/0327385 | A1 | 11/2016 | Kimura |
| 2016/0328854 | A1 | 11/2016 | Kimura |
| 2016/0334939 | A1 | 11/2016 | Dawson et al. |
| 2016/0350594 | A1 | 12/2016 | McDonald |
| 2016/0379368 | A1 | 12/2016 | Sakas et al. |
| 2017/0094254 | A1 | 3/2017 | Lee et al. |
| 2017/0098305 | A1 | 4/2017 | Gossow |
| 2017/0102461 | A1 | 4/2017 | Tezuka et al. |
| 2017/0221226 | A1 | 8/2017 | Shen et al. |
| 2017/0270689 | A1 | 9/2017 | Messely et al. |
| 2017/0284799 | A1 | 10/2017 | Wexler et al. |
| 2017/0307544 | A1 | 10/2017 | Nagata |
| 2017/0347086 | A1 | 11/2017 | Watanabe |
| 2018/0010903 | A1 | 1/2018 | Takao et al. |
| 2018/0011194 | A1 | 1/2018 | Masuda et al. |
| 2018/0073863 | A1 | 3/2018 | Watanabe |
| 2018/0080761 | A1 | 3/2018 | Takao et al. |
| 2018/0143018 | A1 | 5/2018 | Kimura |
| 2018/0156609 | A1 | 6/2018 | Kimura |
| 2018/0227566 | A1 | 8/2018 | Price et al. |
| 2018/0249142 | A1 | 8/2018 | Hicks et al. |
| 2018/0324405 | A1 | 11/2018 | Thirion |
| 2018/0329038 | A1 | 11/2018 | Lin et al. |
| 2018/0357871 | A1 | 12/2018 | Siminoff |
| 2018/0367786 | A1* | 12/2018 | Furst ..................... A61C 9/006 |
| 2018/0376116 | A1 | 12/2018 | Grundhöfer |
| 2019/0064359 | A1 | 2/2019 | Yang |
| 2019/0107387 | A1 | 4/2019 | Kimura |
| 2019/0108743 | A1 | 4/2019 | Kimura |
| 2019/0122057 | A1 | 4/2019 | Kimura |
| 2019/0295270 | A1 | 9/2019 | Kimura |
| 2019/0297241 | A1 | 9/2019 | Kimura |
| 2019/0377088 | A1 | 12/2019 | Kimura |
| 2020/0003556 | A1 | 1/2020 | Kimura |
| 2020/0051268 | A1 | 2/2020 | Kimura |
| 2020/0182974 | A1 | 6/2020 | Kimura |
| 2020/0236315 | A1 | 7/2020 | Kimura |

FOREIGN PATENT DOCUMENTS

| | | | |
|---|---|---|---|
| CN | 103559735 A | 2/2014 | |
| CN | 104160243 A | 11/2014 | |
| CN | 104515514 A | 4/2015 | |
| CN | 110070564 * | 5/2021 | ............. G06T 7/246 |
| DE | 102020007613 * | 3/2021 | ......... G01B 11/2513 |
| EP | 0358628 A2 | 3/1990 | |
| JP | H4-51112 A | 2/1992 | |
| JP | H9-61126 | 3/1997 | |
| JP | 4485365 B2 | 2/2006 | |
| JP | 2006-313116 A | 11/2006 | |
| JP | 2007-10346 A | 1/2007 | |
| JP | 2007-187581 A | 7/2007 | |
| JP | 2007-315864 A | 12/2007 | |
| JP | 2010-091855 A | 4/2010 | |
| JP | 2010-101683 A | 5/2010 | |

(56) References Cited

FOREIGN PATENT DOCUMENTS

| | | | |
|---|---|---|---|
| JP | 2010-256182 A | 11/2010 | |
| JP | 2012-047500 A | 3/2012 | |
| JP | 2014-020978 A | 2/2014 | |
| JP | 2014-511590 A | 5/2014 | |
| JP | 2014-122789 A | 7/2014 | |
| JP | 6038415 B1 | 12/2016 | |
| JP | 6241793 B2 | 12/2017 | |
| KR | 10-2013-0000356 A | 1/2013 | |
| KR | 10-2013-0037152 A | 4/2013 | |
| KR | 10-2015-0101749 A | 9/2015 | |
| KR | 10-2016-0020323 | 2/2016 | |
| KR | 10-2017-0005649 A | 1/2017 | |
| KR | 10-2017-0054221 A | 5/2017 | |
| KR | 10-2017-0094968 | 8/2017 | |
| TW | I320480 B | 2/2010 | |
| TW | I451129 B | 4/2012 | |
| WO | WO 2012/081506 A1 | 6/2012 | |
| WO | WO 2013/0145164 | 10/2013 | |
| WO | WO 2014/0106843 A2 | 7/2014 | |
| WO | WO 2014/131064 | 8/2014 | |
| WO | WO 2015/166915 A1 | 11/2015 | |
| WO | WO2015166915 | * 11/2015 | ............. G01C 15/06 |

\* cited by examiner

300

306

308

US 11,580,662 B2

ASSOCIATING THREE-DIMENSIONAL COORDINATES WITH TWO-DIMENSIONAL FEATURE POINTS

CROSS REFERENCE TO RELATED APPLICATIONS

This application claims the priority of U.S. Provisional Patent Application Ser. No. 62/954,533, filed Dec. 29, 2019, which is herein incorporated by reference in its entirety.

FIELD OF THE INVENTION

The invention related generally to distance measurement, and relates more particularly to associating three-dimensional coordinates with two-dimensional feature points.

BACKGROUND

Facial recognition is often used for device and application authentication. For instance, a real-time facial image of a user who is attempting to be authenticated to a device or application may be compared to one or more stored facial images of authorized users, if the facial image of the user attempting authentication matches a stored facial image, the user may be authenticated.

Some facial recognition techniques acquire a two-dimensional image of a user's face, extract feature points from the two-dimensional image, and then generate a user identification based on the positional relationship of the feature points. Since the feature points are represented by two-dimensional coordinates, a correction may be performed using three-dimensional measurement values. For instance, if the overall distance to the user's face in the two-dimensional image is known, it may be possible to determine the absolute size of the user's face, which helps to correct the positional relationships of the feature points. Additionally, it may be possible to detect the inclination of the user's face by acquiring the entire shape of a three-dimensional map and using the shape to correct the feature points.

SUMMARY

In one example, a method performed by a processing system including at least one processor includes causing a light projecting system of a distance sensor to project a three-dimensional pattern of light onto an object, wherein the three-dimensional pattern of light comprises a plurality of points of light that collectively forms the pattern, causing a light receiving system of the distance sensor to acquire an image of the three-dimensional pattern of light projected onto the object, causing the light receiving system to acquire a two-dimensional image of the object, detecting a feature point in the two-dimensional image of the object, identifying an interpolation area for the feature point, and computing three-dimensional coordinates for the feature point by interpolating using three-dimensional coordinates of two points of the plurality of points that are within the interpolation area.

In another example, a non-transitory machine-readable storage medium is encoded with instructions executable by a processing system including at least one processor. When executed, the instructions cause the processing system to perform operations including causing a light projecting system of a distance sensor to project a three-dimensional pattern of light onto an object, wherein the three-dimensional pattern of light comprises a plurality of points of light that collectively forms the pattern, causing a light receiving system of the distance sensor to acquire an image of the three-dimensional pattern of light projected onto the object, causing the light receiving system to acquire a two-dimensional image of the object, detecting a feature point in the two-dimensional image of the object, identifying an interpolation area for the feature point, and computing three-dimensional coordinates for the feature point by interpolating using three-dimensional coordinates of two points of the plurality of points that are within the interpolation area.

In another example, an apparatus includes a processing system including at least one processor and a non-transitory machine-readable storage medium encoded with instructions executable by the processing system. When executed, the instructions cause the processing system to perform operations including causing a light projecting system of a distance sensor to project a three-dimensional pattern of light onto an object, wherein the three-dimensional pattern of light comprises a plurality of points of light that collectively forms the pattern, causing a light receiving system of the distance sensor to acquire an image of the three-dimensional pattern of light projected onto the object, causing the light receiving system to acquire a two-dimensional image of the object, detecting a feature point in the two-dimensional image of the object, identifying an interpolation area for the feature point, and computing three-dimensional coordinates for the feature point by interpolating using three-dimensional coordinates of two points of the plurality of points that are within the interpolation area.

DETAILED DESCRIPTION

The present disclosure broadly describes an apparatus, method, and non-transitory computer-readable medium for associating three-dimensional coordinates with two-dimensional feature points. As discussed above, some facial recognition techniques acquire a two-dimensional image of a user's face, extract feature points from the two-dimensional image, and then generate a user identification based on the positional relationship of the feature points. Since the feature points are represented by two-dimensional coordinates, a correction may be performed using three-dimensional measurement values.

Additionally, techniques such as spline calculations may be used to reconstruct a three-dimensional surface from a two dimensional image. However, reconstructing an entire three-dimensional surface in this manner can be a time- and computation-intensive process; thus, this technique is not ideal when computation resources are limited and/or when results are needed immediately.

Examples of the present disclosure greatly reduce the amount of calculation and time needed to match a three-dimensional distance detection pattern to a two-dimensional image by performing an interpolation calculation at a specified point in the two-dimensional image. In particular, a feature point in the two-dimensional image may be detected, and two or more points of the three-dimensional pattern that are within an interpolation area of the feature point may be used to estimate the three-dimensional coordinates of the feature point by interpolating between the three-dimensional positions of the two or more points. Depending upon various factors such as the type of the feature point, environmental/ambient conditions, and the arrangement of the points of the three-dimensional pattern, techniques such as in-plane processing, spline processing, and Bezier curve processing may be used to perform the interpolation.

Although examples of the present disclosure are described within the context of facial recognition, it will be understood that the disclosed examples may also be used to improve the calculation of distance and features of objects other than faces. For instance, examples of the present disclosure may also be useful in detecting hand gestures which may be associated with predefined actions to be taken by a computing system or device.

Within the context of the present disclosure, a "two-dimensional image" is understood to refer to an image acquired using light in a spectrum that is visible to the human eye (e.g., by a conventional red, green, blue (RGB) image sensor). By contrast, an image of a three-dimensional pattern is acquired using light in a spectrum that is invisible to the human eye (e.g., by an infrared imaging sensor).

Figure 1A:
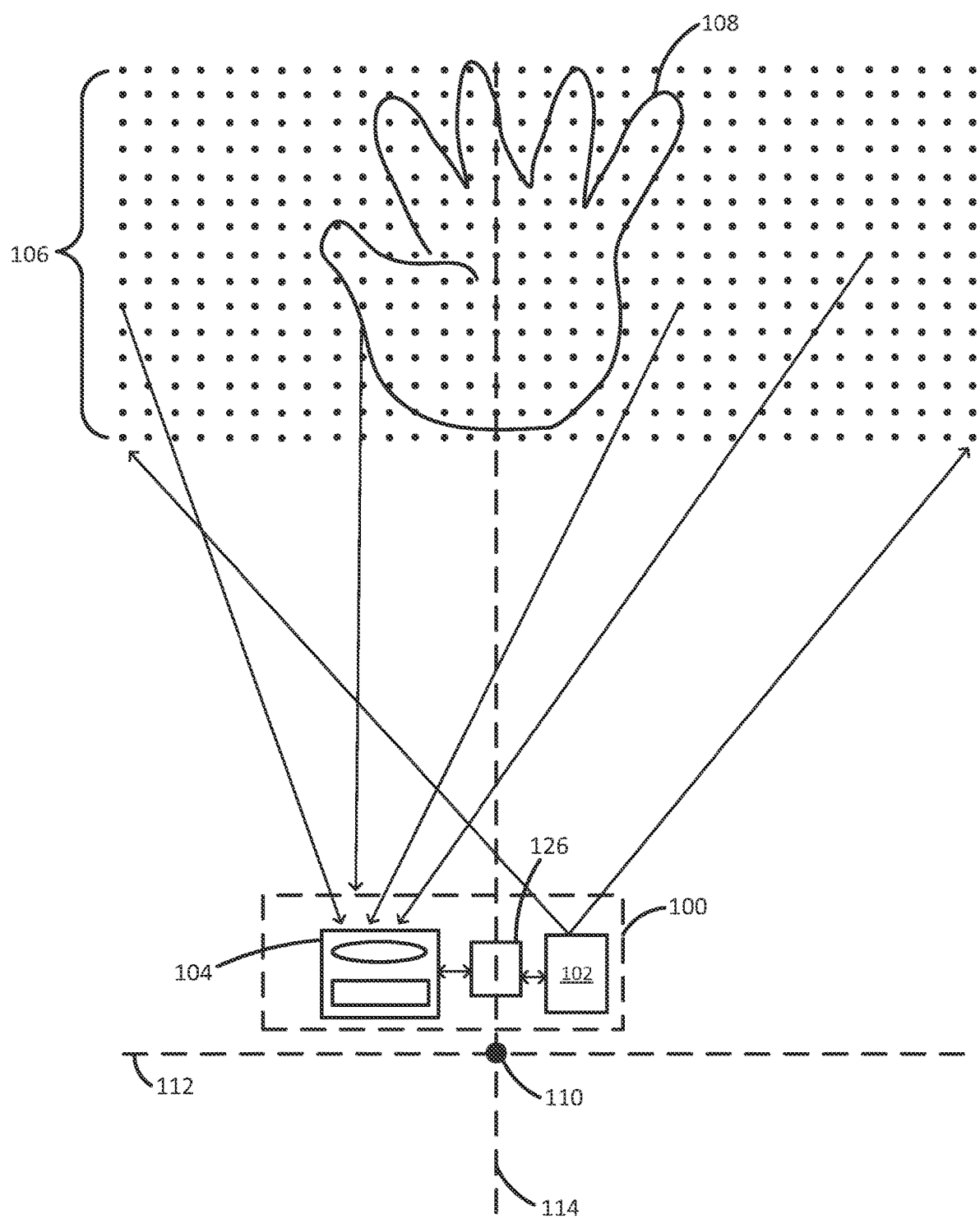
FIGS. 1A-1B illustrate different configurations of an example distance sensor of the present disclosure.
Figure 1B:
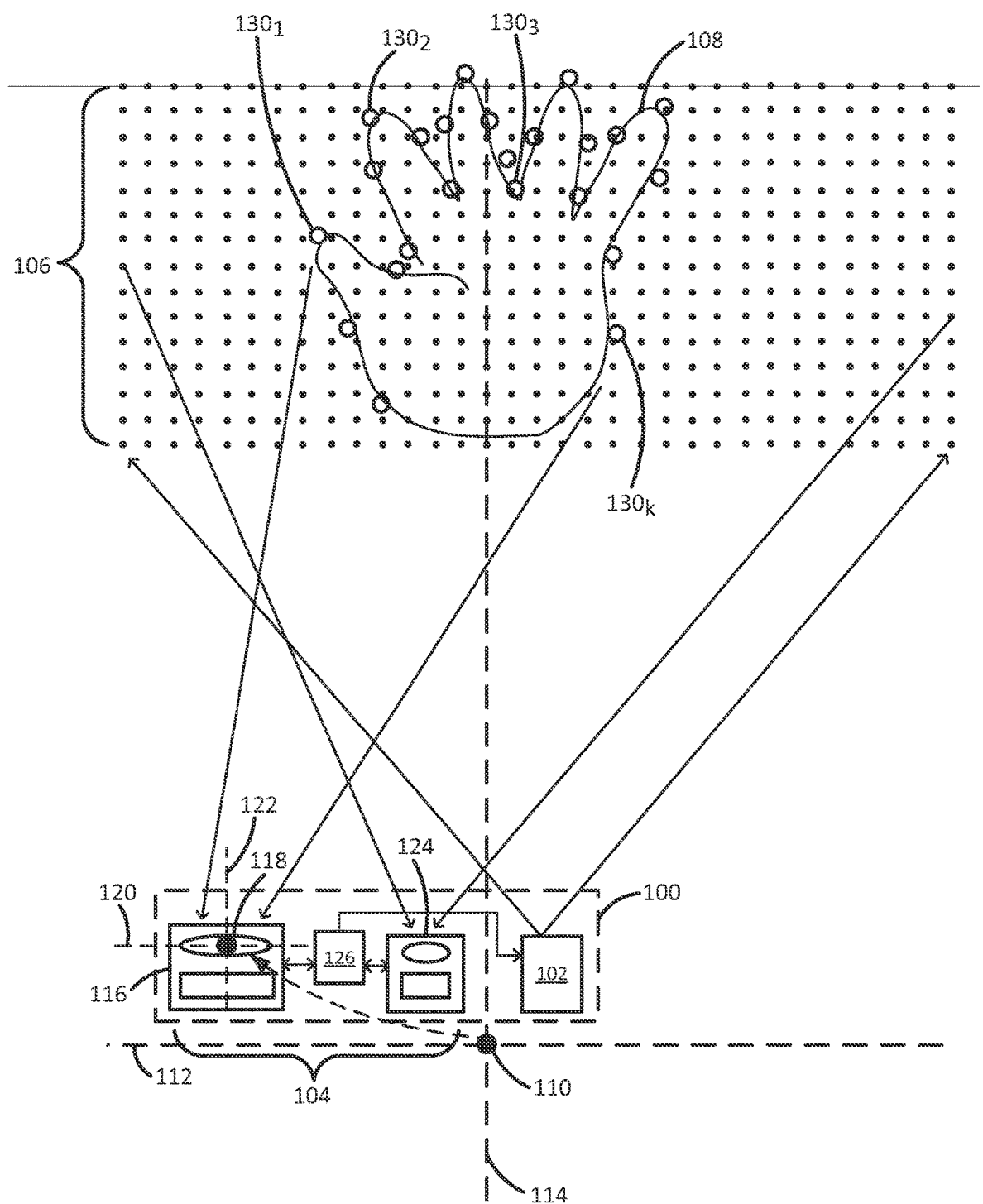

FIGS. 1A-1B illustrate different configurations of an example distance sensor 100 of the present disclosure. Where the same components are present in FIGS. 1A and 1B, the same reference numerals are used. The distance sensor 100 may be configured in a manner similar to the distance sensors described in U.S. patent application Ser. Nos. 14/920,246, 15/149,323, and 15/149,429.

FIG. 1A, for instance, illustrates a distance sensor 100 that includes a light projecting system 102, a light receiving system 104, and a processor 126. The light projecting system 104 is configured to project a pattern 106 onto a surface or object 108, where the pattern 106 comprises a plurality of points of light. The points of light may be arranged in a grid, as shown in FIG. 1A (e.g., arranged in a plurality of rows and a plurality of columns). The rows and columns of the grid may be aligned in a collinear manner or may be staggered. The points of light may be invisible to the human eye, but visible to an imaging sensor of the distance sensor 100 (as discussed in further detail below).

Thus, the points of the three-dimensional pattern 106 may be arranged in a coordinate system that is defined by a first axis 112 and a second axis 114 that is perpendicular to the first axis 112. A datum point 110 may be defined where the first axis 112 and the second axis 114 intersect.

To this end, the light projecting system 102 may include one or more laser light sources that are capable of projecting beams of light in a wavelength that is substantially invisible to the human eye (e.g., an infrared wavelength). The light projecting system 104 may also include one or more diffractive optical elements for splitting the beams of light into additional beams of light. When each beam of light is incident upon a surface or object 108, a point of the pattern 106 is created on the surface or object 108.

The light receiving system 104 may include an imaging sensor for capturing images. The imaging sensor may be a complementary metal-oxide-semiconductor (CMOS) sensor. The images may include a two-dimensional image of the surface or object 108, as well an image of the three-dimensional pattern 106 on the surface or object 108. Thus, in one example, where the light receiving system 104 includes a single imaging sensor (e.g., camera) to capture both the two-dimensional images and the images of the three-dimensional pattern 106, the light receiving system 104 may also include a bandpass filter. A bandpass filter may be needed in this case to remove ambient light when capturing two-dimensional images (which are acquired using illumination by the same light source, e.g., infrared light source, which is used to generate the pattern 106). However, in other examples where the two-dimensional images are acquired in a darker environment, the bandpass filter may not be needed to remove the ambient light.

In the example where the two-dimensional image of the surface or object 108 and the image of the three-dimensional pattern 106 are acquired by the same imaging sensor, an automatic correspondence between positions in the images may be obtained using the coordinate system associated with the first axis 112, the second axis 114, and the datum point 110, as discussed in further detail below.

The processor 126 may be configured to control the light projecting system 106 to project the three-dimensional pattern 106 and to illuminate the surface or object 108 for image capture. The processor 126 may also control the light receiving system 104 to capture the two-dimensional images of the surface or object 108 and the images of the three-dimensional pattern 106. The processor 126 may also perform operations to align the two-dimensional images of the surface or object 108 with the images of the three-dimensional pattern 106, as discussed in further detail below.

The distance sensor 100 of FIG. 1B is similar to the distance sensor illustrated in FIG. 1A, except that in FIG. 1B, the light receiving system 104 includes separate imaging sensors for acquiring the two-dimensional images and the images of the three-dimensional pattern 106. Specifically, the light receiving system 104 of FIG. 1B comprises a first imaging sensor 124 for capturing images of the three-dimensional pattern 106 and a second imaging sensor 116 for capturing two-dimensional images of the surface or object 108. In this case, neither the first imaging sensor 124 nor the second imaging sensor 116 may include a bandpass filter. Both the first imaging sensor 124 and the second imaging sensor 116 may comprise CMOS imaging sensors and may have fixed positions relative to each other.

However, since the two-dimensional image and the image of the three-dimensional pattern 106 are captured by different imaging sensors and different optical systems, it becomes necessary to correct a parallax between the two-dimensional image and the image of the three-dimensional pattern 106. Specifically, feature points of the surface or object 108 are obtained from the two-dimensional image captured by the second imaging sensor 116. However, the positions of the two-dimensional image and the image of the three-dimensional pattern 106 need to be aligned in order to be able to correctly associate three-dimensional coordinates with the feature points.

In one example, the parallax correction may be computed through a calibration process. For instance, the second imaging sensor 116 may capture a two-dimensional image of a calibration object having a known size relative to a camera reference position (e.g., a checkerboard) while the first imaging sensor 124 simultaneously captures an image of the three-dimensional pattern 106. A relationship between the two-dimensional image of the calibration object and the image of the three-dimensional pattern 106 may be observed and stored.

In another example, the methods described in U.S. patent application Ser. No. 16/869,358 may be used to determine the relationship between the first imaging sensor 124 and the second imaging sensor 116 without the need for infrared lighting and/or calibration objects.

In one example, the parallax correction results in adjustment of the distance measurement coordinate axes for the three-dimensional pattern 106 to the front nodal point of the second imaging sensor 116. As illustrated, this results in the first axis 112 being moved to a position of a corrected first axis 120, the second axis 114 being moved to a position of a corrected second axis 122, and the datum point 110 being moved to a position of a corrected datum point 118.

Figure 2:
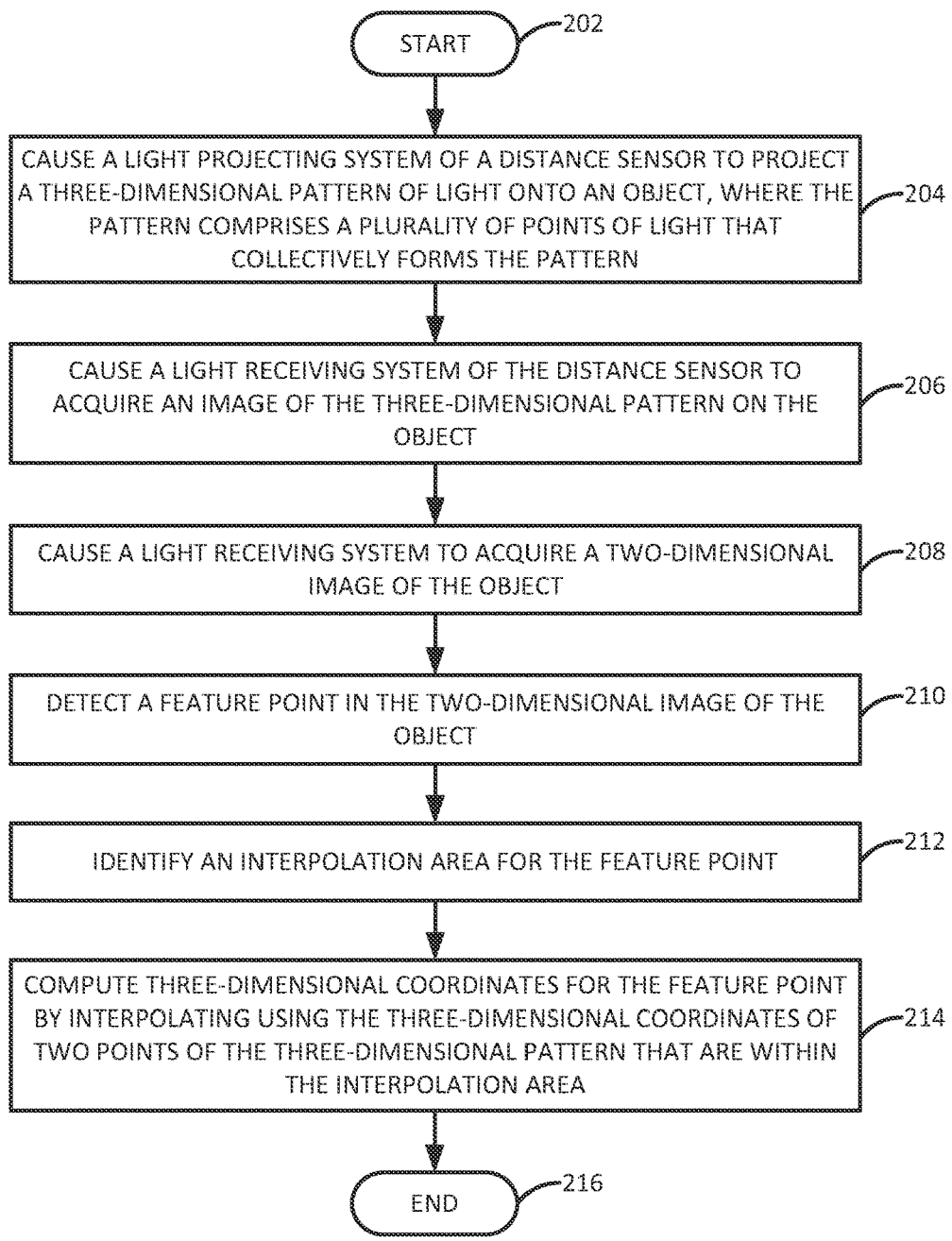
FIG. 2 is a flow diagram illustrating an example method for associating three-dimensional coordinates with a feature point of a two-dimensional image, according to examples of the present disclosure.

FIG. 2 is a flow diagram illustrating an example method 200 for associating three-dimensional coordinates with a feature point of a two-dimensional image, according to examples of the present disclosure. The method 200 may be performed, for example, by a processing system including at least one processor, such as the processing system of a distance sensor (e.g., processor 126 of FIGS. 1A and 1B). For the sake of example, the method 200 is described as being performed by a processing system.

The method 200 may begin in step 202. In step 204, the processing system may cause a light projecting system of a distance sensor to project a three-dimensional pattern of light onto an object, wherein the pattern of light comprises a plurality of points of light that collectively forms the pattern. For instance, the processing system may send an electronic signal to the light projecting system, where the electronic signal encodes an instruction. As discussed above, the light may be of a wavelength that is substantially invisible to the human eye, but that is detectable by an imaging sensor of the distance sensor (e.g., infrared light).

The pattern of light may be created by a plurality of beams projected by the distance sensor's light projecting system. The plurality of beams may project the plurality of points of light onto the object, where the plurality of points of light collectively forms the pattern of light, or a "projection pattern." In one example, the plurality of points of light may be arranged into a grid pattern comprising a plurality of rows and a plurality of columns. For instance, U.S. patent application Ser. No. 16/150,918, which is herein incorporated by reference in its entirety, describes a method for obtaining a three-dimensional dot map by multi-point projection.

In step 206, the processing system may cause a light receiving system of the distance sensor to acquire an image of the three-dimensional projection pattern on the object. The image of the three-dimensional projection pattern may also be referred to as a "dot map" (although the points of light may take shapes other than dots). For instance, the processing system may send an electronic signal to the light receiving system, where the electronic signal encodes an instruction. As discussed above, although the projection pattern (e.g., the light forming the projection pattern) may be invisible to the human eye, it may be visible to an image sensor of the light receiving system.

In step 208, the processing system may cause the light receiving system of the distance sensor to acquire a two-dimensional image of the object (e.g., without the projection pattern). In one example, the light receiving system may illuminate the object in order to acquire the two-dimensional image. In one example, where both the image of the three-dimensional projection pattern and the two-dimensional image of the object are captured by the same imaging sensor, the light receiving system may illuminate the object using the same light source that is used to generate the projection pattern (e.g., an infrared light source).

In step 210, the processing system may detect a feature point in the two-dimensional image of the object. In one example, the type of the feature point that is detected may vary based on the type of the object, and the three-dimensional characteristics of the feature point will vary depending on the type of the feature point. Subsequent processing techniques may vary depending upon the type of the feature point.

For example, where the object is a face (e.g., as might be the case for facial authentication systems), a two-dimensional feature point could comprise a point on a mouth, a nose, and eye, or the like. However, where the object is a hand (e.g., as might be the case for gesture recognition systems), a two-dimensional feature point could comprise a point on a fingertip, the base of a finger, the palm of the hand, or the like.

Figure 3A:
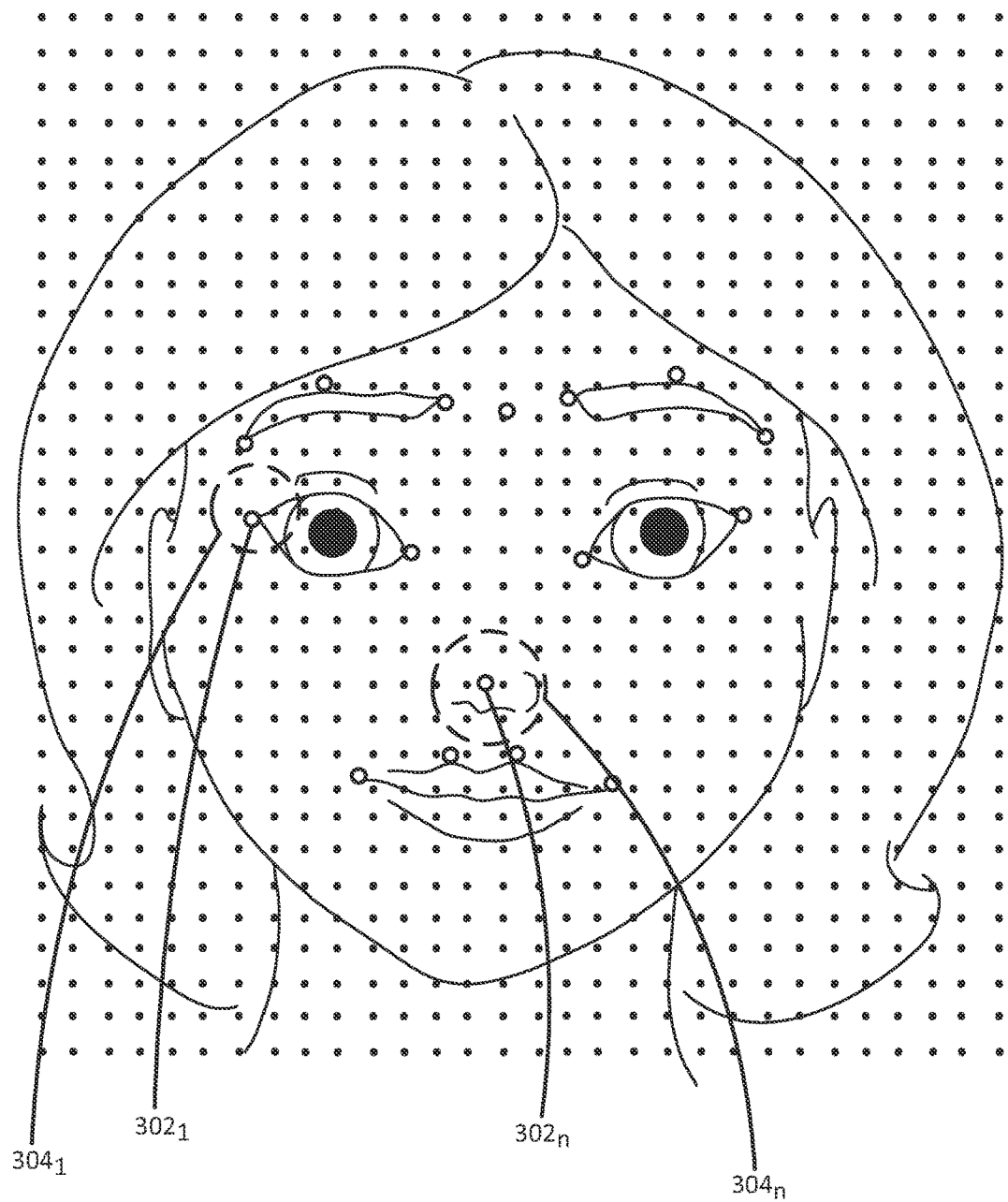
FIG. 3A illustrates an example forward facing image of a face onto which the three-dimensional pattern is projected.

FIG. 3A, for instance, illustrates an example forward facing image 300 of a face onto which the three-dimensional pattern (represented as black dots in FIG. 3A) is projected. The image 300 includes a plurality of feature points $302_1$-$302_n$ (hereinafter individually referred to as a "feature point 302" or collectively referred to as "feature points 302"), which are shown in FIG. 3A as white dots. In FIG. 3A, each point of the three-dimensional pattern includes distance information that may be computed using the datum point (e.g., as illustrated in FIGS. 1A-1B) of the three-dimensional pattern as a reference.

Figure 3B:
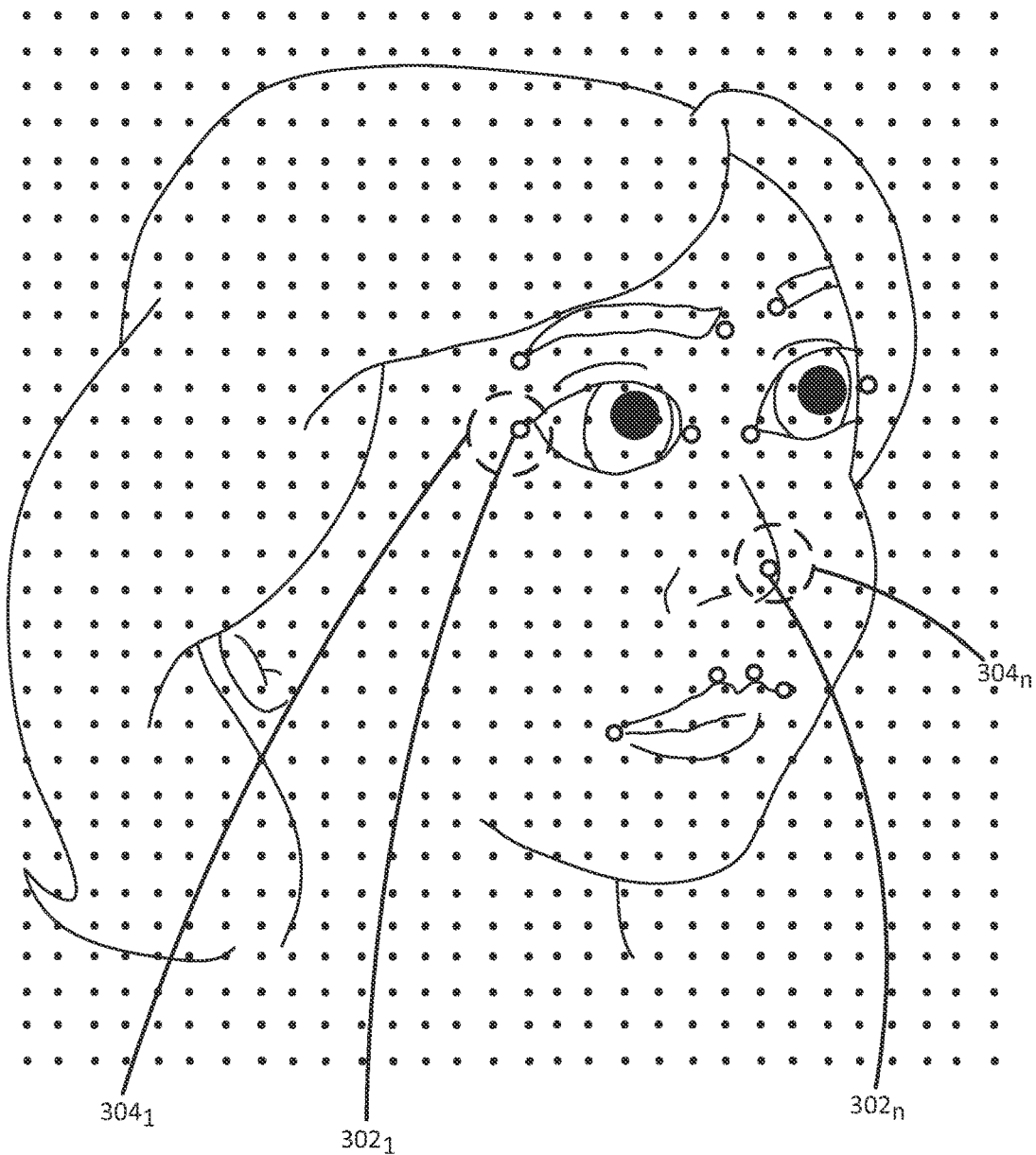
FIG. 3B illustrates an example diagonally captured image of the face illustrated in FIG. 3A.
Figure 3C:
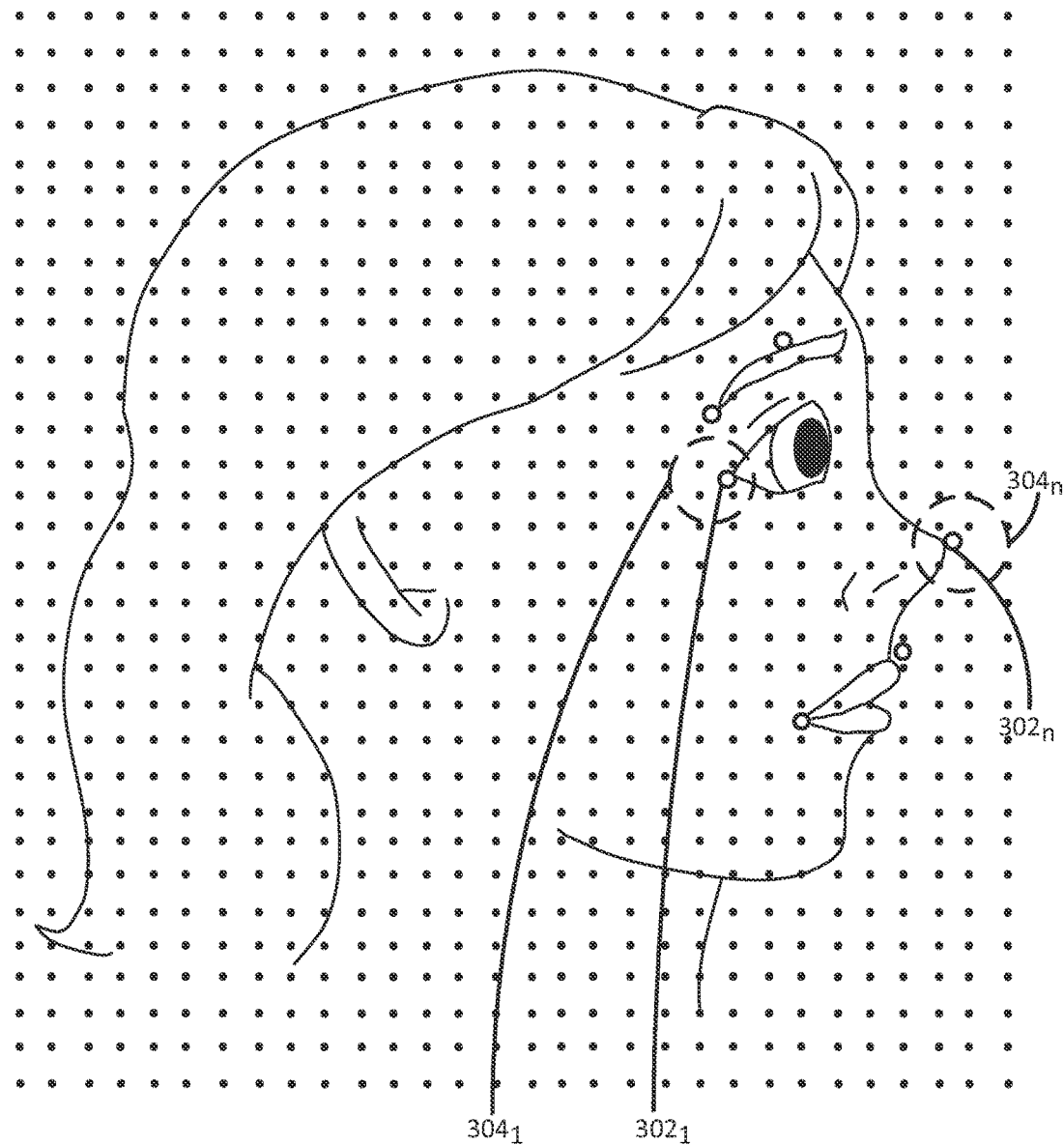
FIG. 3C illustrates an example laterally captured image of the face illustrated in FIG. 3A.

FIG. 3B illustrates an example diagonally captured image 306 of the face illustrated in FIG. 3A, while FIG. 3C illustrates an example laterally captured image 308 of the face illustrated in FIG. 3A. As can be seen from FIGS. 3A-3C collectively, each feature point 302 has different characteristics with respect to the direction from which the image of the face is captured. For instance, the feature point $302_n$ on the tip of the nose does not clearly indicate a feature in the forward facing image 300, but provides a clearer indication of the feature in the laterally captured (profile) image 308. However, the feature point $302_n$ is also located near the end of the facial profile or outline, where there are fewer surrounding points of the three-dimensional pattern that are incident upon the face. On the other hand, the feature point $302_1$ at the outer corner of the eye is not located near the end of the facial profile or outline in any of the images 300, 306, and 308. The correspondence between each feature point 302 and a facial part (e.g., tip of nose, outer corner of eye, etc.) may be assumed in advance, and may motivate the selection of a specific interpolation technique as discussed in greater detail below.

Referring back to FIG. 2, in step 212, the processing system may identify an interpolation area for the feature point. The interpolation area may comprise a predefined radius surrounding the feature point (e.g., limited to all points of the three-dimensional pattern that are neighboring or immediately adjacent to the feature point, all points of the three-dimensional pattern within x centimeters of the feature point, etc.). For instance, referring again to FIGS. 3A-3C, the feature point $302_1$ is associated with an interpolation area $304_1$, while the feature point $302_n$ is associated with an interpolation area $304_n$.

In step 214, the processing system may compute the three-dimensional coordinates for the feature point by interpolating using the three-dimensional coordinates of two (or more) points of the three-dimensional pattern that are within the interpolation area of the feature point. Computation of the three-dimensional coordinates may include selecting an interpolation technique from among a plurality of candidate interpolation techniques. For instance, in one example, the interpolation may be performed using in-plane processing techniques. In another example, a spline curve may be used to match three-dimensional coordinates to feature point. In another example, a Bezier curve may be used to match three-dimensional coordinates to feature point.

Figure 4A:
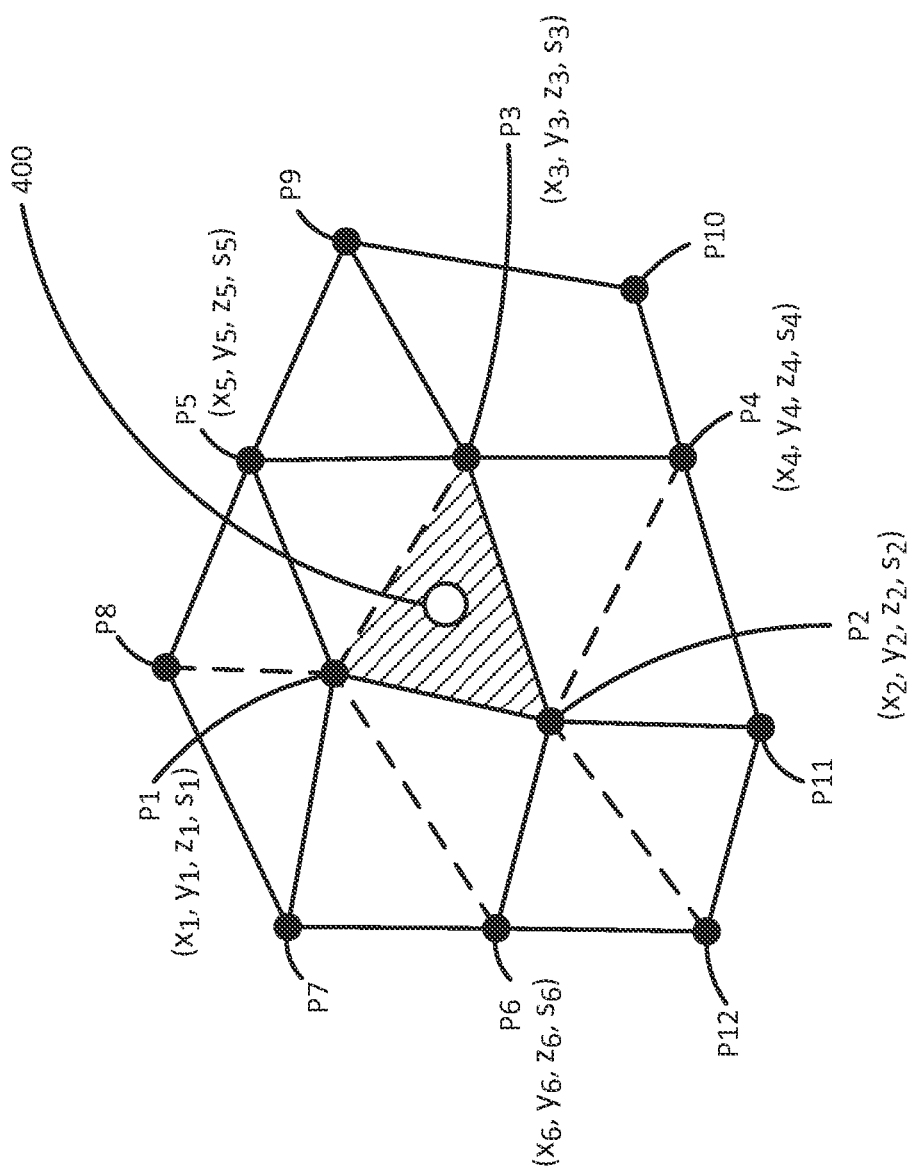
FIG. 4A illustrates an example feature point and the interpolation area surrounding the feature point.

For in-plane processing, it may be assumed that each mesh area (e.g., area bounded by neighboring points) of the three-dimensional pattern comprises a plane. FIG. 4A, for instance, illustrates an example feature point 400 and the interpolation area surrounding the feature point 400. Specifically points P1, P2, P3, P4, P5, and P6 of the three-dimensional pattern neighbor the feature point 400, while additional points of the three-dimensional pattern may neighbor points P1-P6. Each point P1-P6 is associated with a set of three-dimensional coordinates (e.g., $x_i$, $y_i$, $z_i$, $s_i$, where I={1, . . . , 6}).

In the example of FIG. 4, it is assumed that there is no parallax (e.g., the coordinate systems of the two-dimensional image and the image of the three-dimensional pattern match, based on the same imaging sensor capturing the two-dimensional image and the image of the three-dimensional pattern). Thus, in this case, the three-dimensional coordinates ($x_0$, $y_0$, $z_0$, $s_0$) of the feature point 400 may be easily calculated by interpolating between the three-dimensional coordinates of the points P1, P2, and P3 using known interpolation methods.

Figure 4B:
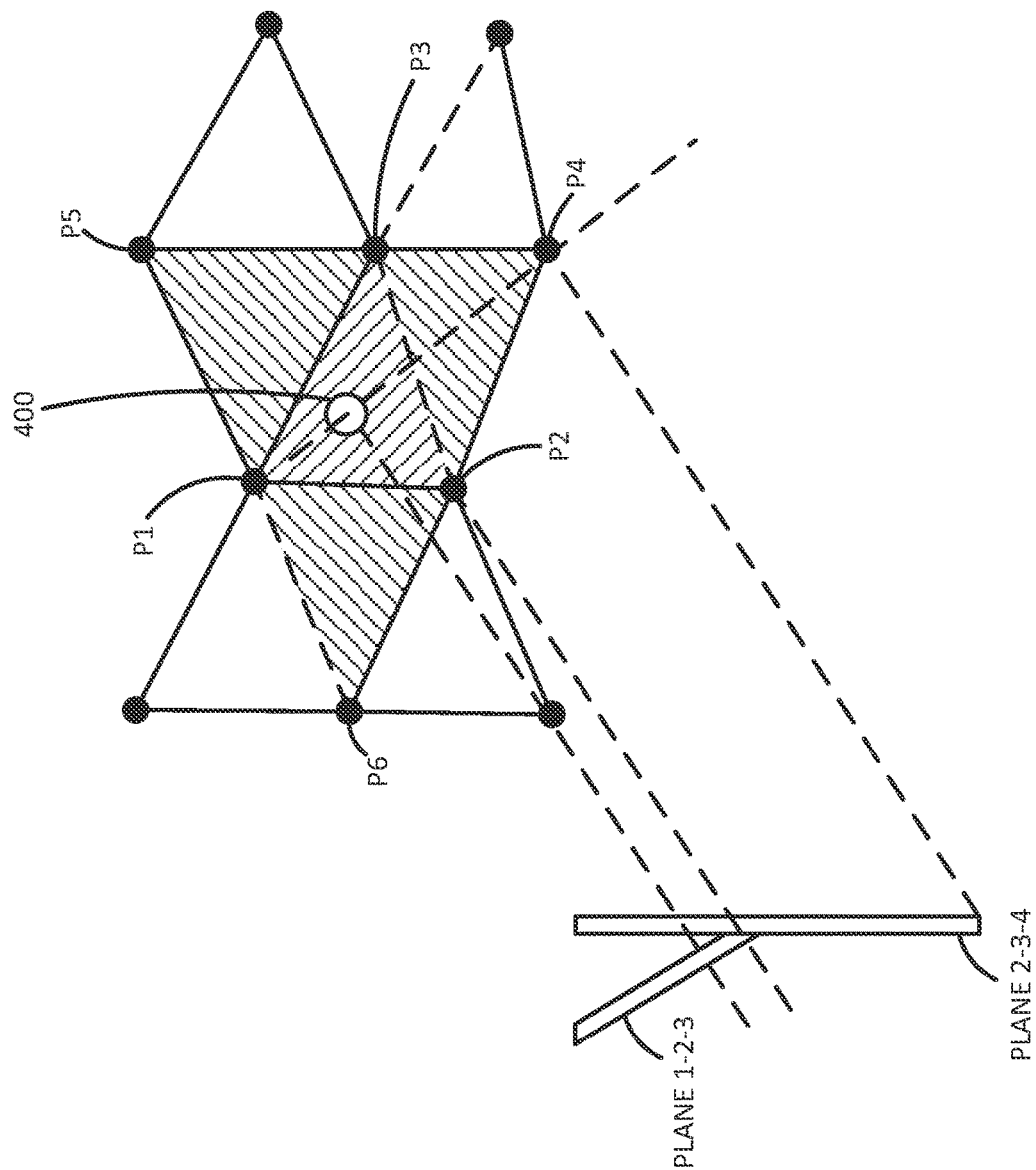
FIG. 4B illustrates an alternate method of calculating the three-dimensional coordinates of the feature point of FIG. 4A.

FIG. 4B illustrates an alternate method of calculating the three-dimensional coordinates of the feature point 400 of FIG. 4A. In the case of FIG. 4B, the relationship of the feature point 400 with the adjacent surface, plane 2-3-4 (which is defined between points P2, P3, and P4 of the three-dimensional pattern), is also considered in the computation using known interpolation methods. Thus, an intermediate three-dimensional coordinate position between planes 1-2-3 and 2-3-4 may yield a three-dimensional coordinate position of the feature point 400.

More particularly, the sides surrounding the feature point 400 are (1-2), (2-3), and (3-1) (where a "side" is defined as a line connecting two points of the three-dimensional pattern, e.g., side 1-2 connects points P1 and P2). One way to obtain the three-dimensional coordinates of the feature point 400 would be to interpolate between the closest side of the surrounding sides to the feature point and the surface adjacent to the closest side. In one example, the interpolation minimizes the number of points in the three-dimensional pattern whose coordinates are used in the interpolation calculation. The points hose coordinates are utilized may be the n points that are closest to the feature point. For instance, the example shown in FIG. 4B utilizes the coordinates of six points (i.e., P1-P6), while the example shown in FIG. 4A utilizes the coordinates of twelve points (i.e., P1-P12). This reduces the computational complexity of the interpolation calculation.

In FIG. 4B, the same computation may be performed using the planes 1-2-6 (defined between points P1, P2, and P6) and 1-3-5 (defined between points P1, P3, and P5). In one example, the most accurate three-dimensional coordinates for the feature point 400 can be calculated by selecting the surface or plane that contributes to the feature point 400 according to the type of the feature point (e.g., end point, center part of smooth surface, etc.).

In other examples, in place of in-plane processing, spline processing and/or Bezier curve processing may be utilized. Spline processing and Bezier curve processing are techniques for smoothly connecting dots in a plane. For instance, spline curves may be used to connect three-dimensional dot arrays on multiple planes arranged side-by-side. Assuming that a first plane that includes the position of the feature point (having two-dimensional coordinates (x,y)) is substantially orthogonal to the planes that include the spline curve (e.g., a first set of spline curves), the cross points of the first plane and each of the first spline curves may be connected with a second spline curve. The position of the feature point on the second spline curve may represent the three-dimensional coordinates (e.g., (x,y,z)) of the feature point. This approach assumes that the points of the three-dimensional pattern are arranged in substantially straight, regular lines (e.g., rows or columns) rather than randomly distributed.

Figure 5:
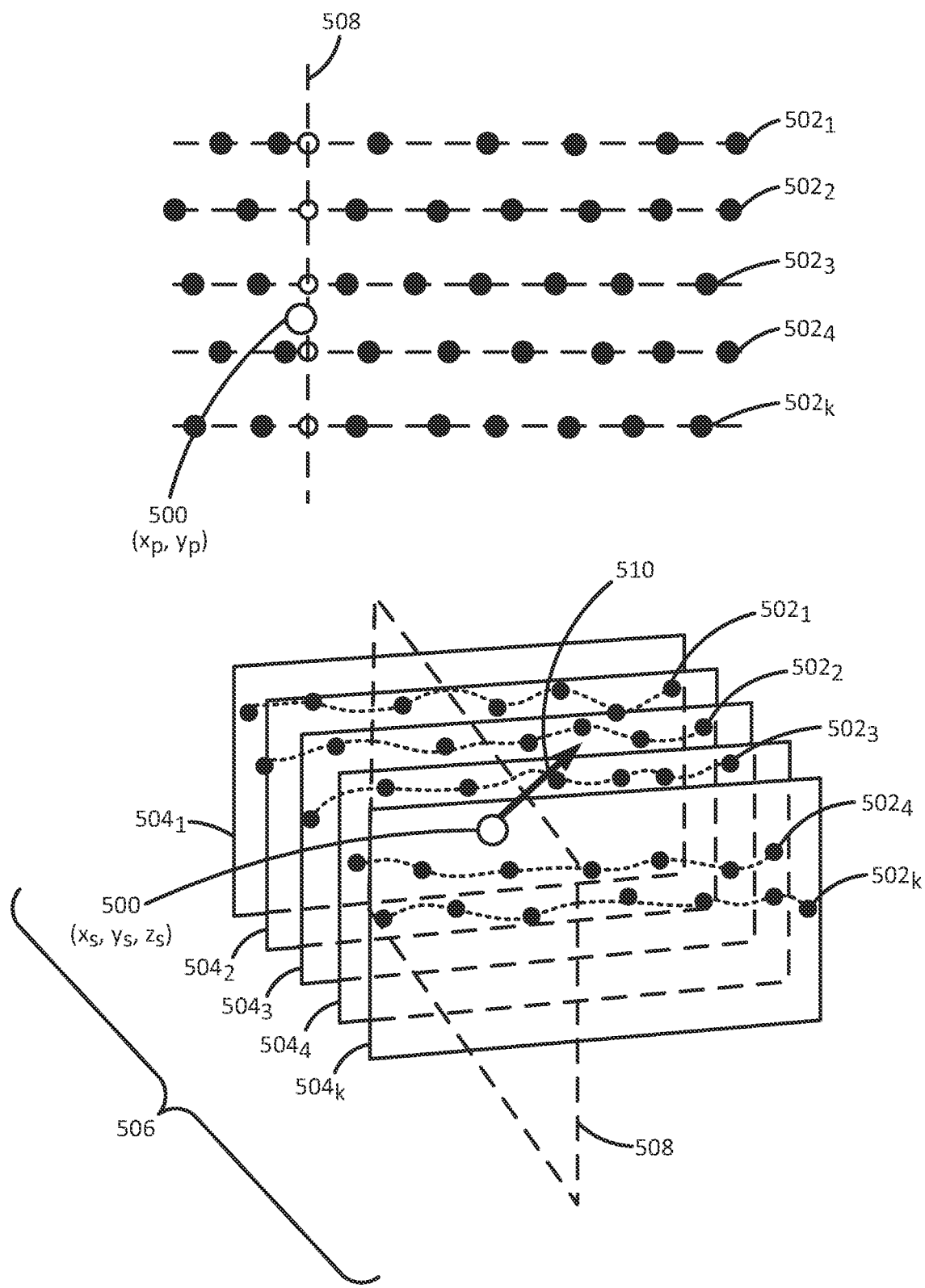
FIG. 5 illustrates the use of a spline curve to match an interpolation position of a point of the three-dimensional pattern with a two-dimensional feature point.

FIG. 5 illustrates the use of a spline curve to match an interpolation position of a point of the three-dimensional pattern with a two-dimensional feature point 500. As illustrated and discussed above, the points of the three-dimensional pattern may be arranged in a substantially linear manner. In the illustrated example, a plurality of spline curves $502_1$-$502_k$ (hereinafter individually referred to as a "spline curve 502" or collectively referred to as "spline curves 502") is obtained from points arranged on a plurality of planes $504_1$-$504_k$ (hereinafter individually referred to as a "plane 504" or collectively referred to as "planes 504") of a first spline 506. Furthermore, a plane 508 passes through the feature point 500 and positioned substantially perpendicular to the plurality of planes 504. Each intersection of the plane 508 and the spline curves is connected to obtain a final spline curve. The three-dimensional coordinates ($x_s$, $y_s$, $z_s$) of the feature point 500 may be obtained from the two-dimensional coordinates ($x_p$, $y_p$) of the feature point 500 and the spline curve. Furthermore, the direction 510 of the feature point 500 (indicative of a surface feature such as a vector, curvature, or the like) can be obtained from the final spline curve and from the plurality of spline curves 502.

A Bezier curve may be obtained from a first plane formed by the points of the three-dimensional pattern surrounding the feature point and a second plane in proximity to the first plane. The three-dimensional coordinates of the feature point can then be obtained from the Bezier curve. A Bezier curve including the two-dimensional feature point may be drawn by using the inclination of a surface adjacent to a triangular area including the feature point and the position of an adjacent boundary line.

Figure 6:
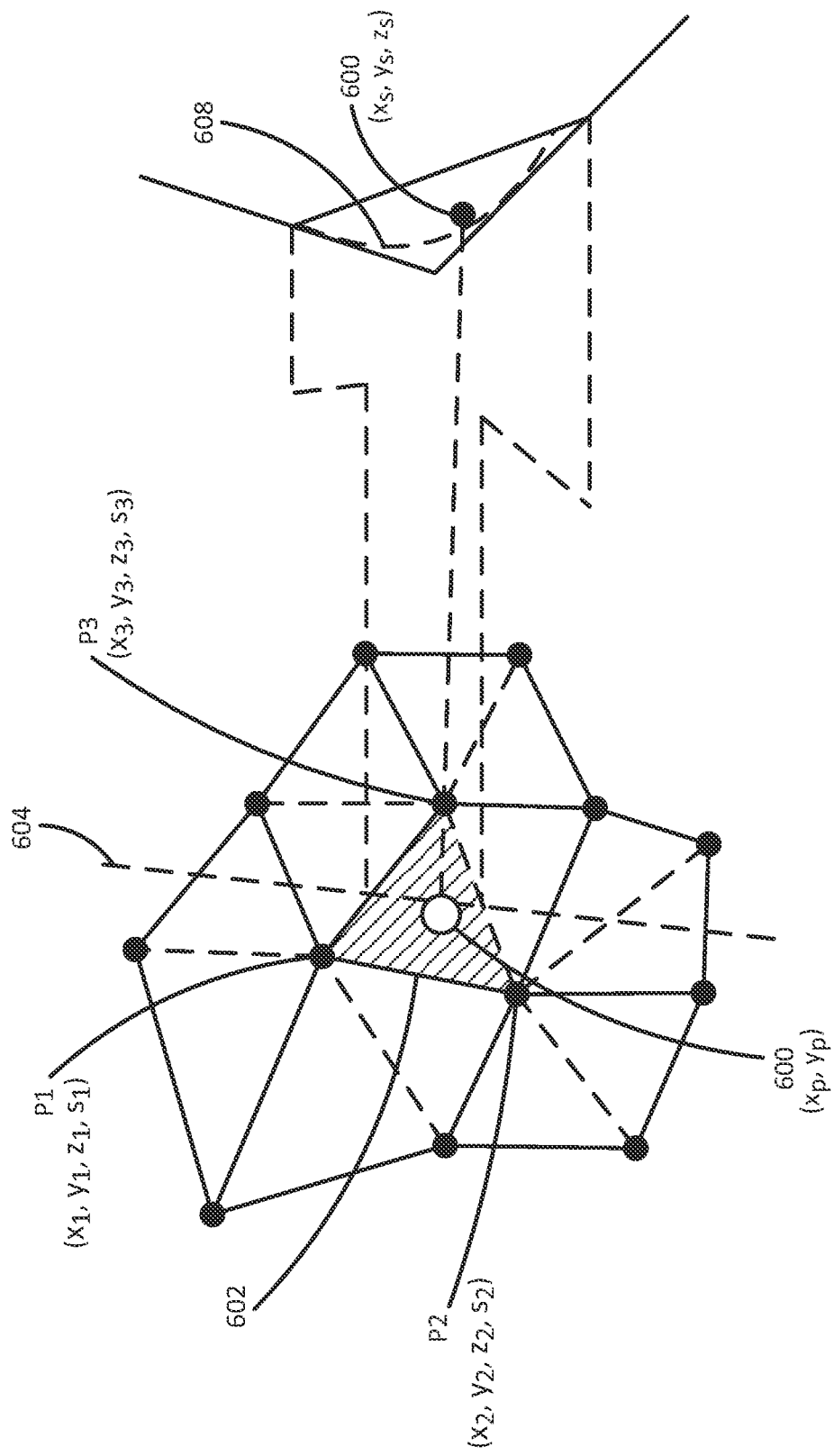
FIG. 6 illustrates the use of a Bezier curve to match an interpolation position of a point of the three-dimensional pattern with a two-dimensional feature point.

FIG. 6 illustrates the use of a Bezier curve to match an interpolation position of a point of the three-dimensional pattern with a two-dimensional feature point 500. In this case, the three-dimensional coordinates of the feature point 600 can be specified by a Bezier curve 608 obtained by a line intersecting a plane 602 adjacent to the plane that includes the two-dimensional feature point 600 and an arbitrary vertical plane 604 passing through the two-dimensional feature point 600.

Whether the interpolation is calculated using an in-plane processing technique, spline processing, or Bezier curve processing, it is sufficient to interpolate between a small number of points of the three-dimensional pattern in the vicinity of the feature point (and only for the feature point's three-dimensional position). This reduces the computational complexity of the interpolation calculation, as discussed above. Additionally, when using spline processing or Bezier curve processing, since the curve of the surface or object may be calculated at the same time, it is relatively simple to calculate the direction in which the surface or object including the feature point is positioned.

In one example, the technique used to compute the three-dimensional coordinates for the feature point may be selected based on consideration of one or more factors which may affect the accuracy of the selected technique, such as the type of the feature point (which may be determined by the processing system prior to computing the three-dimensional coordinates), the environmental conditions, and other factors.

The method 200 may end in step 216.

The accuracy of the method 200, and in particular the accuracy of the three-dimensional coordinates associated with a feature point of a two-dimensional image, may vary due to factors such as the distance to the surface or object, the specification of the calibration, and the interpolation technique used. However, the distance of the surface or object an the specification of the calibration are factors that can be determined in advance (i.e., in advance of performing the method 200), and, thus, an estimated confidence in the computed three-dimensional coordinates can be output in association with the three-dimensional coordinates.

The required or desired accuracy of the three-dimensional coordinates may vary depending on the application and on the type of the feature point. For instance, for facial authentication, the accuracy required may differ depending on whether the feature point is a point on an eye, a mouth, a nose, or another facial feature.

In one example, if points of the three-dimensional pattern are missing (e.g., not recognized in the image of the three-dimensional pattern), or if abnormal coordinate values (e.g., values that are inconsistent with a known spacing of the points) are detected among the points of the three-dimensional pattern, then the technique used to detect the three-dimensional coordinates of the points may be modified. For instance, the three-dimensional coordinates of the points of the three-dimensional pattern may be detected on a continuous basis (e.g., including before and after capture of the two-dimensional image). Then, the three-dimensional coordinates for the points can be compared over time to detect abnormalities or anomalies in singular detections. This approach may also be useful for compensating in instances where the position of a point is unstable (e.g., due to unstable lighting conditions and instances in which the surface or object material, and the like), where the surface of object comprises materials having different reflective properties (e.g., black and white) that require different exposure conditions.

It should be noted that although not explicitly specified, some of the blocks, functions, or operations of the method 200 described above may include storing, displaying and/or outputting for a particular application. In other words, any data, records, fields, and/or intermediate results discussed in the method 200 can be stored, displayed, and/or outputted to another device depending on the particular application. Furthermore, blocks, functions, or operations in FIG. 2 that recite a determining operation, or involve a decision, do not imply that both branches of the determining operation are practiced. In other words, one of the branches of the determining operation may not be performed, depending on the results of the determining operation.

Although examples of the present disclosure are discussed within the context of facial authentication, it will be appreciated that the techniques disclosed herein could be applied to other applications in which it may be useful to associate three-dimensional coordinates with two-dimensional feature points. For instance, examples of the present disclosure may also be applied to path recognition, gesture recognition, and other applications.

Figure 7A:
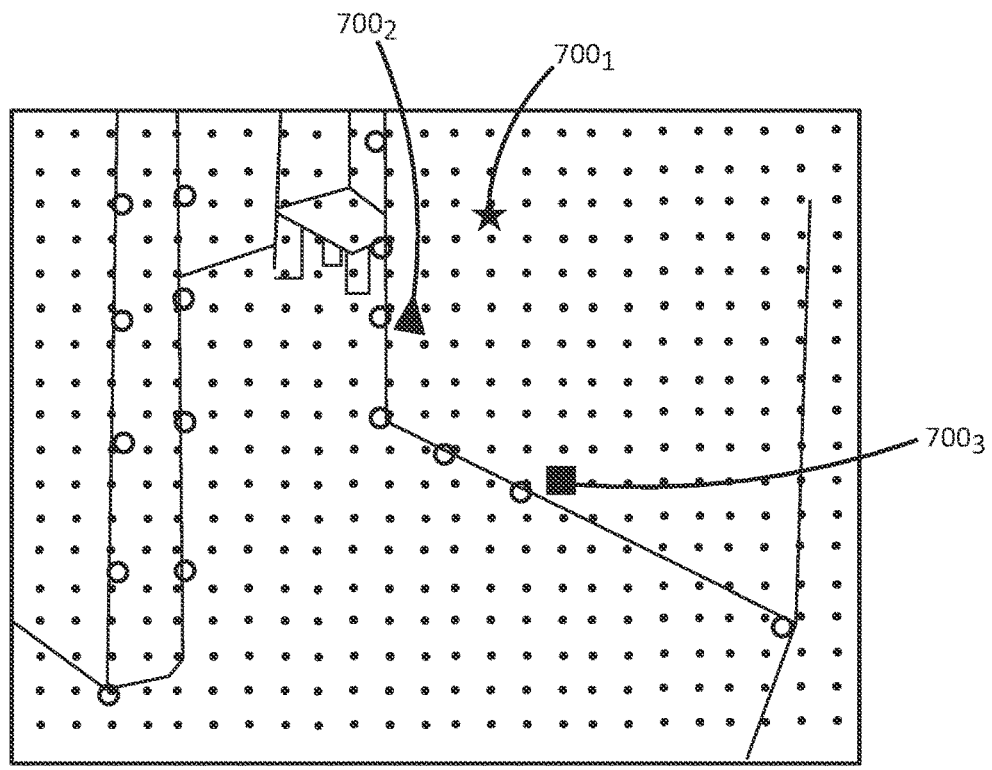
FIG. 7A illustrates a first portion of a passage in which the techniques of the present disclosure may be applied to path recognition.
Figure 7B:
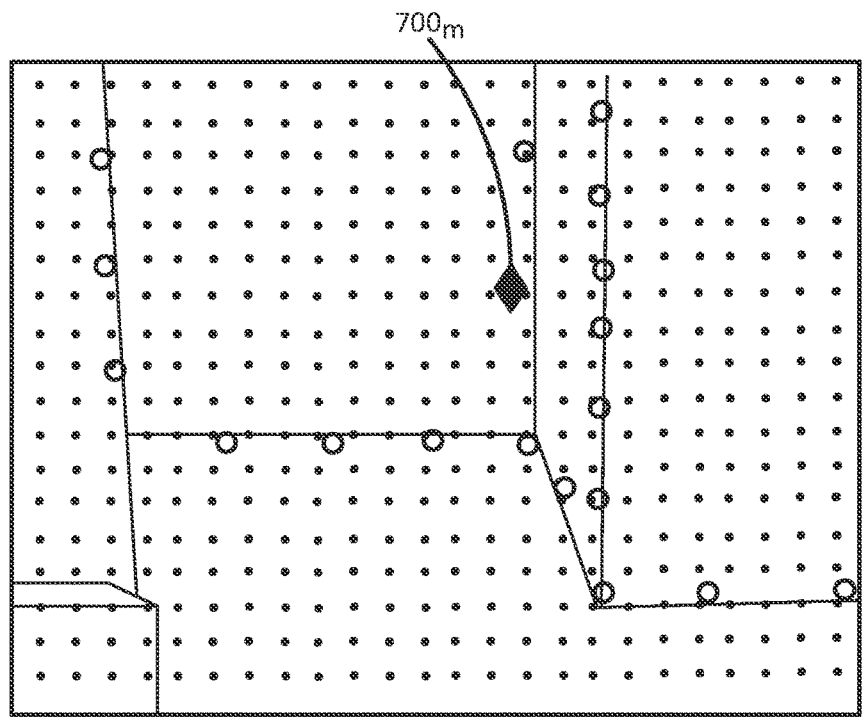
FIG. 7B illustrates a second portion of the passage of FIG. 7A.

FIGS. 7A-7B, for instance, illustrate example images of a passage in which the techniques of the present disclosure may be applied to path recognition. Specifically, FIG. 7A illustrates a first portion of a passage in which the techniques of the present disclosure may be applied to path recognition, while FIG. 7B illustrates a second portion of the passage of FIG. 7A. In particular, known markings $700_1$-$700_m$ (hereinafter individually referred to as a "marking 700" or collectively referred to as "markings 700") may be attached to the passage at key points. Three-dimensional recognition of the passage may be facilitated by employing the markings 700 as feature points. In one example, the markings 700 may have different shapes or patterns to indicate different types of key points (e.g., planes, corners, edges, bottom surfaces, etc.) within the passage. For instance, the marking $700_1$ may be shaped to indicate a plane portion of a wall; the marking $700_2$ may be shaped to indicate an edge portion of a wall; the marking $700_3$ may be shaped to indicate a bottom surface of a wall; and the marking $700_m$ may be shaped to indicate a corner of a wall. The use of specialized markings that are specific to different types of features may improve the efficiency of the calculation for three-dimensional coordinates.

Within the context of path detection, examples of the present disclosure may be used to detect the positions of obstacles, e.g., by unmanned vehicles (e.g., automobiles, drones, and the like). The markings 700 on known surfaces may be used to increase the confidence of three-dimensional coordinates that are computed for feature points, improving the ability of vehicles to avoid collisions with obstacles.

Referring back to FIG. 1B, examples of the present disclosure may also be used for hand gesture recognition, which may be useful in applications where specific hand gestures may be mapped to specific operations of a computing system or device (e.g., waving causes an image to be captured, thumbs up causes an application to launch, etc.). Feature points $130_1$-$130_k$ (hereinafter individually referred to as a "feature point 130" or collectively referred to as "feature points 130") on a two-dimensional image of a hand (object 108) may need to be represented in the coordinate system of the three-dimensional sensor (e.g., first imaging sensor 124). Conversely, any point in the coordinate system of the three-dimensional sensor may be replace with a two-dimensional camera coordinate (e.g., pixel x, y coordinates). The conversion from two dimensions to three dimensions, or vice versa, is possible if the mutual positional relationship between the coordinate systems is known.

The process of moving the three-dimensional coordinate system is relatively easy because the process can be performed only by mathematical calculations. Thus, the process to obtain the position of the coordinate system of the three-dimensional imaging sensor relative to the coordinate system of the two-dimensional imaging sensor may start by determining the position of the three-dimensional imaging sensor coordinate system relative to a mechanical reference point (which may already been done during the three-dimensional sensor calibration process). Mechanical positioning of the three-dimensional sensor and the two-dimensional sensor may be fixed. The position of the coordinates (optical position) of the two-dimensional sensor with respect to the mechanical reference (e.g., center axis deviation, image rotation, image distortion, etc.) point may be measured and corrected.

If the coordinates axis of the three-dimensional sensor are congruent with the optical axis of the two-dimensional camera, then the point (x=0, y=0, z) in the coordinate system of the three-dimensional sensor may remain at the center of the two-dimensional image. Furthermore, by placing the datum point of the coordinate system of the three-dimensional sensor at the incident point (i.e., front nodal point of the capture lens) of the two-dimensional camera, the coordinate system of the three-dimensional sensor can always be congruent with the two-dimensional image coordinate position.

Figure 8:
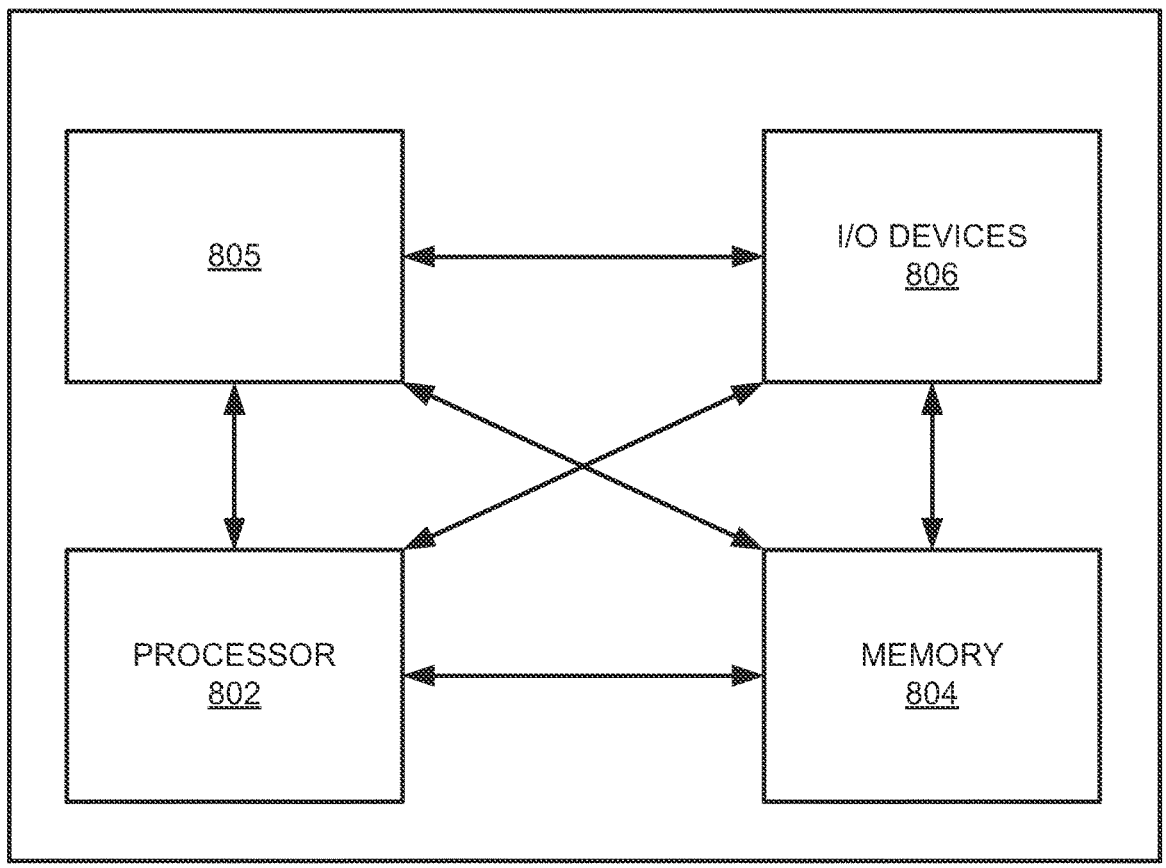
FIG. 8 depicts a high-level block diagram of an example electronic device for calculating the distance from a sensor to an object.

FIG. 8 depicts a high-level block diagram of an example electronic device 800 for calculating the distance from a sensor to an object. As such, the electronic device 800 may be implemented as a processor of an electronic device or system, such as a distance sensor (e.g., processor 126 of FIGS. 1A-1B).

As depicted in FIG. 8, the electronic device 800 comprises a hardware processor element 802, e.g., a central processing unit (CPU), a microprocessor, or a multi-core processor, a memory 804, e.g., random access memory (RAM) and/or read only memory (ROM), a module 805 for associating three-dimensional coordinates with two-dimensional feature points, and various input/output devices 806, e.g., storage devices, including but not limited to, a tape drive, a floppy drive, a hard disk drive or a compact disk drive, a receiver, a transmitter, a display, an output port, an input port, and a user input device, such as a keyboard, a keypad, a mouse, a microphone, a camera, a laser light source, an LED light source, and the like.

Although one processor element is shown, it should be noted that the electronic device 800 may employ a plurality of processor elements. Furthermore, although one electronic device 800 is shown in the figure, if the method(s) as discussed above is implemented in a distributed or parallel manner for a particular illustrative example, i.e., the blocks of the above method(s) or the entire method(s) are implemented across multiple or parallel electronic devices, then the electronic device 800 of this figure is intended to represent each of those multiple electronic devices.

It should be noted that the present disclosure can be implemented by machine readable instructions and/or in a combination of machine readable instructions and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the blocks, functions and/or operations of the above disclosed method(s).

In one example, instructions and data for the present module or process 805 for associating three-dimensional coordinates with two-dimensional feature points, e.g., machine readable instructions can be loaded into memory 804 and executed by hardware processor element 802 to implement the blocks, functions or operations as discussed above in connection with the method 200. Furthermore, when a hardware processor executes instructions to perform "operations", this could include the hardware processor performing the operations directly and/or facilitating, directing, or cooperating with another hardware device or component, e.g., a co-processor and the like, to perform the operations.

The processor executing the machine readable instructions relating to the above described method(s) can be perceived as a programmed processor or a specialized processor. As such, the present module 805 for associating three-dimensional coordinates with two-dimensional feature points of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or an electronic device such as a computer or a controller of a safety sensor system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
    causing, by a processing system of a distance sensor, a light projecting system of the distance sensor to project a three-dimensional pattern of light onto an object, wherein the three-dimensional pattern of light comprises a plurality of points of light that collectively forms the pattern;
    causing, by the processing system, a light receiving system of the distance sensor to acquire an image of the three-dimensional pattern of light projected onto the object;
    causing, by the processing system, the light receiving system to acquire a two-dimensional image of the object;
    detecting, by the processing system, a feature point in the two-dimensional image of the object;
    identifying, by the processing system, an interpolation area for the feature point; and
    computing, by the processing system, three-dimensional coordinates for the feature point by interpolating using three-dimensional coordinates of two points of the plurality of points that are within the interpolation area.

2. The method of claim 1, wherein the detecting further comprises:
    detecting, by the processing system, a type of the feature point.

3. The method of claim 2, wherein the computing further comprises:
    selecting, by the processing system, an interpolation technique for the computing from among a plurality of candidate interpolation techniques.

4. The method of claim 3, wherein the interpolation technique is an in-plane interpolation technique.

5. The method of claim 3, wherein the interpolation technique is a spline processing technique.

6. The method of claim 3, wherein the interpolation technique is a Bezier curve processing technique.

7. The method of claim 1, wherein the interpolation area is limited to a subset of the plurality of points of the three-dimensional pattern that are located within a predefined radius of the feature point.

8. The method of claim 7, wherein the predefined radius limits the interpolation area to points of the plurality of points that are neighbors of the feature point.

9. The method of claim 1, wherein the computing further comprises:
obtaining, by the processing system, a direction of the feature point from the interpolating.

10. The method of claim 1, wherein the three-dimensional coordinates of the two points are continuously acquired by the processing system.

11. The method of claim 1, wherein the distance sensor is part of a facial authentication system.

12. The method of claim 1, wherein the distance sensor is part of a gesture recognition system.

13. The method of claim 1, wherein the distance sensor is part of a path recognition system.

14. A non-transitory machine-readable storage medium encoded with instructions executable by the processing system including at least one processor, wherein, when executed by the processing system, the instructions cause the processing system to perform operations, the operations comprising:
causing a light projecting system of a distance sensor to project a three-dimensional pattern of light onto an object, wherein the three-dimensional pattern of light comprises a plurality of points of light that collectively forms the pattern;
causing a light receiving system of the distance sensor to acquire an image of the three-dimensional pattern of light projected onto the object;
causing the light receiving system to acquire a two-dimensional image of the object;
detecting a feature point in the two-dimensional image of the object;
identifying an interpolation area for the feature point; and
computing three-dimensional coordinates for the feature point by interpolating using three-dimensional coordinates of two points of the plurality of points that are within the interpolation area.

15. The non-transitory machine-readable storage medium of claim 14, wherein the detecting further comprises:
Detecting a type of the feature point.

16. The non-transitory machine-readable storage medium of claim 15, wherein the computing further comprises:
selecting an interpolation technique for the computing from among a plurality of candidate interpolation techniques.

17. The non-transitory machine-readable storage medium of claim 16, wherein the interpolation technique is an in-plane interpolation technique.

18. The non-transitory machine-readable storage medium of claim 16, wherein the interpolation technique is a spline processing technique.

19. The non-transitory machine-readable storage medium of claim 16, wherein the interpolation technique is a Bezier curve processing technique.

20. An apparatus, comprising:
a processing system; and
a non-transitory machine-readable storage medium encoded with instructions executable by the processing system, wherein, when executed, the instructions cause the processing system to perform operations, the operations comprising:
causing a light projecting system of a distance sensor to project a three-dimensional pattern of light onto an object, wherein the three-dimensional pattern of light comprises a plurality of points of light that collectively forms the pattern;
causing a light receiving system of the distance sensor to acquire an image of the three-dimensional pattern of light projected onto the object;
causing the light receiving system to acquire a two-dimensional image of the object;
detecting a feature point in the two-dimensional image of the object; identifying an interpolation area for the feature point; and
computing three-dimensional coordinates for the feature point by interpolating using three-dimensional coordinates of two points of the plurality of points that are within the interpolation area.

* * * * *